US009701807B2

(12) United States Patent
Lu et al.

(10) Patent No.: US 9,701,807 B2
(45) Date of Patent: Jul. 11, 2017

(54) PROCESS FOR MAKING POLYMERS HAVING NANOSTRUCTURES INCORPORATED INTO THE MATRIX OF THE POLYMER

(71) Applicant: PPG INDUSTRIES OHIO, INC., Cleveland, OH (US)

(72) Inventors: Songwei Lu, Wexford, PA (US); Thomas G. Rukavina; Mehran Arbab, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 14/960,578

(22) Filed: Dec. 7, 2015

(65) Prior Publication Data

US 2016/0083556 A1 Mar. 24, 2016

Related U.S. Application Data

(60) Division of application No. 14/714,545, filed on May 18, 2015, now abandoned, which is a continuation of application No. 13/455,609, filed on Apr. 25, 2012, now Pat. No. 9,045,606, which is a division of application No. 10/932,641, filed on Sep. 1, 2004, now Pat. No. 8,178,615.

(51) Int. Cl.

| | |
|---|---|
| ***C08K 3/22*** | (2006.01) |
| ***C08L 31/00*** | (2006.01) |
| ***B82Y 30/00*** | (2011.01) |
| ***C08L 69/00*** | (2006.01) |
| ***C08J 3/205*** | (2006.01) |

(52) U.S. Cl.

CPC ................ *C08K 3/22* (2013.01); *B82Y 30/00* (2013.01); *C08J 3/205* (2013.01); *C08K 3/2279* (2013.01); *C08L 31/00* (2013.01); *C08L 69/00* (2013.01); *C08K 2003/2227* (2013.01); *C08K 2003/2231* (2013.01); *C08K 2003/2241* (2013.01); *C08K 2003/2244* (2013.01)

(58) Field of Classification Search

CPC .... C08K 3/22; C08K 2003/2241; C08L 69/00
See application file for complete search history.

(56) References Cited

U.S. PATENT DOCUMENTS

| | | | |
|---|---|---|---|
| 3,891,594 A | 6/1975 | Taylor | |
| 4,130,673 A | 12/1978 | Larkin | |
| 4,430,471 A | 2/1984 | Toothill et al. | |
| 4,607,087 A * | 8/1986 | Moriya | C08F 18/24 526/227 |
| 5,470,910 A | 11/1995 | Spanhel et al. | |
| 5,807,607 A | 9/1998 | Smith et al. | |
| 5,962,608 A | 10/1999 | Ryang et al. | |
| 6,224,979 B1 | 5/2001 | Ryang et al. | |
| 6,620,872 B2 | 9/2003 | Fisher | |
| 6,951,666 B2 | 10/2005 | Kodas et al. | |
| 2003/0207976 A1 | 11/2003 | Yadav et al. | |
| 2004/0151928 A1 | 8/2004 | Kaneshiro et al. | |
| 2006/0229406 A1 | 10/2006 | Silverman et al. | |

FOREIGN PATENT DOCUMENTS

| | | |
|---|---|---|
| DE | 19721600 A1 | 11/1998 |
| RU | 2224710 C1 | 2/2004 |
| WO | 93/07179 A2 | 4/1993 |
| WO | 0200026 A1 | 1/2002 |
| WO | 03/050193 A1 | 6/2003 |

OTHER PUBLICATIONS

Kaddami, H, et al, "Different Solvent Free Synthetic Routes to Organic/Inorganic Hybrid Materials", Organic/Inorganic Hybrid Materials II. San Francisco, CA, Apr. 5-9, 1999, Materials Research Society Symposium Proceedings, vol. 576, Warrrendale, PA: Mrs, US, vol. 576, (Apr. 5, 1999), pp. 51-61, XP000897890 ISBN: 1-55899-483-1 Abstract p. 51, last paragraph—p. 53, paragraph 2, p. 59, paragraph 2.

PCT International Search Report and Written Opinion of the International Searching Authority mailed Dec. 9, 2005, corresponding to International Application No. PCT/US2005/030376.

S. W. Lu, U. Sohling, M. Mennig & H. Schmidt, "Nonlinear Optical Properties of Lead Sulfide Nanocrystals in Polymeric Coatings", Nanotechnology 13 (2002) 669-673.

Sayilkan et al., "Hydrothermal synthesis and characterization of nanocrystelline ZrO2 and surgace modification with 2-acetoacetoxyethyl methacrylate," J. Sol-Gel Sci. Technol. (2009), vol. 51, pp. 182-189.

* cited by examiner

*Primary Examiner* — Vickey Nerangis
(74) *Attorney, Agent, or Firm* — The Webb Law Firm

(57) ABSTRACT

The present invention is directed toward a polymer and a method for making a polymer that has nanostructures incorporated into the matrix of the polymer. The method of the invention involves the following steps: mixing a precursor solution for the polymer with a precursor for the nanostructures to form a mixture; forming nanostructures in the mixture from the precursor of the nanostructures; and forming a polymer from the precursor solution of the polymer so that the nanostructures are incorporated into the polymer matrix.

8 Claims, No Drawings

PROCESS FOR MAKING POLYMERS HAVING NANOSTRUCTURES INCORPORATED INTO THE MATRIX OF THE POLYMER

CROSS REFERENCE TO RELATED APPLICATION

The present patent application is a divisional of U.S. patent application Ser. No. 14/714,545, filed May 18, 2015, which is a continuation of U.S. patent application Ser. No. 13/455,609, filed Apr. 25, 2012, now U.S. Pat. No. 9,045,606, issued Jun. 2, 2015, which is a divisional of U.S. patent application Ser. No. 10/932,641, filed Sep. 1, 2004, now U.S. Pat. No. 8,178,615, issued May 15, 2012, each of which is incorporated herein by reference in its entirety.

FIELD OF INVENTION

The present invention relates to a process for making polymers having nanostructures incorporated into the matrix of the polymer and to the polymers themselves.

BACKGROUND OF THE INVENTION

Products such as aerospace and automotive transparencies, optical lenses, coating compositions, fiberglass surface modifiers, etc. are made of various polymers. In an attempt to make better products, scientists and engineers have tried to optimize the performance properties of the polymers used to make the products. Various techniques have been proposed for optimizing the performance properties of polymers.

For example, scientists and engineers have attempted to incorporate nanostructures into polymer matrices to modify the performance properties of a polymer. Because nanostructures have significantly different physical properties from corresponding bulk material and the polymer matrix, incorporating the nanostructures changes the performance properties of the polymer. Nanostructures have been incorporated into polymer matrices to improve the thermal stability of polymers and to decrease the chemical activity of polymers.

Conventionally, nanostructures have been incorporated into the matrix of a polymer by taking pre-made nanostructures and dispersing them into the polymer solution. Typically, the dispersing step includes several other steps such as modifying the surface, mixing, stirring, heating, milling, etc. The conventional process is inefficient due to the multiple steps involved and tends to produce polymers in which the nanostructures agglomerate. When nanostructures agglomerate in the polymer, the nanostructures can effectively become regular sized particles and the desired effect of incorporating the nanostructures is reduced.

The present invention provides an improved process for making a polymer having nanostructures incorporated into the matrix of the polymer. Polymers produced according to the present invention undergo reduced nanostructure agglomeration.

SUMMARY OF THE INVENTION

In a non-limiting embodiment, the present invention is a method for making a polymer that has nanostructures incorporated into the matrix of the polymer comprising: mixing a precursor solution for the polymer with a precursor for the nanostructures to form a mixture; forming nanostructures in the matrix of the polymer from the precursor of the nanostructures; and forming a polymer from the precursor solution of the polymer.

In another non-limiting embodiment of the invention, the present invention is a method for making a polymer that has nanostructures incorporated into the matrix of the polymer comprising: mixing a precursor solution for the polymer comprising polyvinyl alcohol with a precursor for the nanostructures selected from monobutyl tin tri-chloride and indium acetate to form a mixture; forming nanostructures in the matrix of the polymer from the precursor of the nanostructures; and forming a polymer from the precursor solution of the polymer.

In yet another embodiment, the present invention is a method for making a polymer that has nanostructures incorporated into the matrix of the polymer comprising: mixing a precursor solution for poly [bis(diethylene glycol) diallylcarbonate], with a precursor for the nanostructures comprising titanium iso-propoxide to form a mixture; forming nanostructures in the matrix of the polymer from the precursor of the nanostructures; and forming a polymer from the precursor solution of the polymer.

In a further embodiment of the invention, the present invention is a method for making a polymer that has nanostructures incorporated into the matrix of the polymer comprising: mixing a precursor solution for trimethylol propane, methylene bis(4-cyclohexylisocyanate), thiodiethanol with a precursor for the nanostructures selected from monobutyl tin tri-chloride and indium acetate to form a mixture; forming nanostructures in the matrix of the polymer from the precursor of the nanostructures; and forming a polymer from the precursor solution of the polymer.

DESCRIPTION OF THE INVENTION

As used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to omit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1.0 to 3.8, 6.6 to 9.7 and 5.5 to 10.

As used herein, the term "nanostructure" refers to three dimensional object wherein the length of the longest dimension ranges from 1 nm to 1000 nm, for example, from 1 nm to 500 nm, or from 1 nm to 100 nm, or from 1 to 40 nm.

As used herein, the phrase "precursor solution for the polymer" refers to any material that can be used as a starting material to form the polymer.

As used herein, the phrase "precursor for the nanostructures" refers to any material that can be used as a starting material to form the nanostructures.

In a non-limiting embodiment, the present invention is a process for making a polymer having nanostructures incorporated into the matrix of the polymer. According to the present invention, the first step in the process involves mixing a precursor solution for a polymer and a precursor for the nanostructures that are to be incorporated into the matrix of the polymer to form a mixture. The precursor solution for the polymer does not include any nanostructures initially. The exact precursor solution for the polymer used in the present invention depends on the polymer that is desired in the end product.

For example, if the desired end product is a polyvinyl acetal resin such as polyvinyl butyl (PVB), suitable precursors for the polymer include, but are not limited to, polyvinyl alcohol (PVA).

As another example, if the desired end product is poly [bis(diethylene glycol) diallylcarbonate], suitable precursors for the polymer include, but are not limited to, bis(diethylene glycol) diallylcarbonate monomer.

As yet another example, if the desired end product is an aliphatic polyurethane, suitable precursors for the polymer include, but are not limited to, 1,4-butanediol, trimethylol propane, and bis(4-isocyanotocyclonexyl) methane which is commercially available as Desmodur® from Bayer Material Science in Pittsburgh, Pa., and thiodiethanol.

In a non-limiting embodiment of the invention, a solvent such as water, ethanol, iso propanol, butanol, etc. is added to the mixture.

According to the present invention, the second step in the process involves forming the nanostructures from the precursor of the nanostructures in the matrix of the polymer. The nanostructures are formed while the viscosity of the polymer is low so that the nanostructures can incorporate themselves into the matrix of the polymer. The formation of the nanostructures can be initiated using various techniques. In a non-limiting embodiment of the invention, the nanostructures are formed by adjusting the pH of the mixture. An acid or base, such as ammonia, can be used to adjust the pH of the solution. Depending on the exact precursor solution of the polymer and the exact precursor for the nanostructures, there is an optimum pH range in which the nanostructures will form. One of ordinary skis in the art will know what the optimum pH range is based on both precursors.

In another non-limiting embodiment, the mixture can be heated to initiate the formation of the nanoparticles. The mixture can be heated to any temperature provided the mixture is not be heated to a temperature above that at which the precursor solution would break down. For example, a precursor solution comprising PVA cannot be heated above 200° C. because that is the temperature at which PVA begins to decompose. Similarly to the pH range, the optimum temperature range at which the particles will form depends on the exact precursor solution of the polymer and the exact precursor for the nanostructures. One of ordinary skill in the art will know what the optimum temperature range is based on both precursors. Generally, the higher the temperature to which the mixture is heated and/or the longer the mixture is heated, the larger the size of the nanostructures that will be formed.

In yet another non-limiting embodiment of the invention, forming the nanostructures is accomplished by heating the mixture after the pH of the mixture is adjusted. In a further non-limiting embodiment of the invention, forming the nanostructures is accomplished by heating the mixture and then adjusting the pH of the mixture.

In various other non-limiting embodiments of the invention, the nanostructures can be formed by using one or more of the following: increasing the pressure on the mixture; by changing the concentration of the precursor solution for the polymer; by using an initiator for nanostructure formation; and by seeding (adding no greater than 5% of the desired nanostructure material based on the projected weight of the formed nanostructures as is well known in the art).

The formed nanostructures are charged species. If the pH of the solution was adjusted to cause the formation of the nanostructures, the charge is a result of the pH adjustment. If no pH adjustment was performed during the nanostructure formation step, a polymeric stabilizer such as, but not limited to, sodium polymethacrylate in water and ammonium polymethacrylate in water, which are both commercially available as Darvan® 7 and as Darvan® C, respectively, from R.T. Vanderbilt Company, Inc. in Norwalk, Conn. can be added to the solution to create the charge.

According to the present invention, the third step involves forming the polymer from a mixture including the precursor solution of the polymer. The formation of the polymer can be initiated using various techniques. One of ordinary skill in the art will know what technique to use based on the precursor solution of the polymer and the precursor for the nanostructures.

In a non-limiting embodiment of the present invention, the second and third steps described above are switched.

The method of making polymers having nanostructures incorporated into the matrix of the polymer according to the present invention is referred to as "in-situ" process. This means the nanostructures are formed during the same process that produces the polymer as opposed to pre-formed nanostructures being dispersed into a polymer solution.

During the method of the present invention, ions (cations and/or anions) can form in the mixture. The formed ions and other process variables such as the pressure of the system in which the mixture is held, can affect the final polymer. For example, the amount of nanostructure formation and the morphology of the nanostructures will vary depending on the types and amount of ions present in the solution.

In the polymer matrix, the nanostructures typically continually approach one another and collide because they possess kinetic energy, Under normal circumstances, some of the nanostructures would become bound together and agglomerate due to various forces such as Van der Waals forces. As discussed above, agglomeration is not desirable because the nanostructures can effectively become regular sized particles and the desired effect of incorporating the nanostructures is reduced.

However, the method of the present invention produces polymers having nanostructures in the matrix of the polymer that do not agglomerate to the extent the performance of the polymer is compromised. The nanostructures do not agglomerate because they are stabilized. The stabilization occurs via three mechanisms: (1) electrostatic stabilization, (2) steric stabilization and (3) a combination of electrostatic stabilization and steric stabilization.

Because the nanostructures in the polymer matrix are similarly charged species, they repel each other. This prevents the nanostructures from coming so close together that they agglomerate. This phenomenon is referred to as electrostatic stabilization.

Because the nanostructures are surrounded by polymer precursor solution when they are formed, the nanostructures lose a degree of freedom which they would otherwise possess as the nanostructures approach each other. This loss of freedom is expressed, in thermodynamic terms, as a reduction in entropy, which provides the necessary barrier to hinder agglomeration. This phenomenon is referred to as steric stabilization. The same principle applies when the method of the invention involves forming the polymer before forming the nanostructures.

The polymer formed according to the present invention can have the following properties. The concentration of the nanostructures in the polymer matrix can range from 0.1% to 90%, for example from 3% to 86% or from 15% to 80% based on volume. The nanostructures in the polymer matrix can have the following shapes: spherical, polyhedral-like cubic, triangular, pentagonal, diamond shaped, needle shaped, rod shaped, disc shaped etc. The nanostructures in the polymer matrix can have an aspect ratio of 1:1 to 1:1,000, for example 1:1 to 1:100.

The nanostructures in the polymer matrix can have a longest dimension ranging from 1 nm to 1,000 nm, for example, 1 nm to 500 nm, or 1 nm to 100 nm, or 1 nm to 40 nm. If the nanostructures agglomerate, the size of the nanostructures could effectively become so large that the desired performance of the polymer is compromised. This is the problem with polymers having preformed nanostructures incorporated into the polymer matrix as discussed earlier.

The polymers formed according to the present invention can be used in a number of applications. The formation of specific polymers having specific nanostructures incorporated into the polymer matrix is discussed below along with commercial applications of the polymers.

In a non-limiting embodiment of the invention, a polyvinylacetal resin such as polyvinyl butyral (PVB) having indium tin oxide (ITO) or antimony tin oxide (ATO) nanostructures incorporated into the polymer matrix is formed. Such a polymer can be formed in the following manner. In the first step, a precursor solution for PVB is mixed with a precursor for ITO or ATO nanostructures.

An example of a suitable precursor solution for PVB is polyvinyl alcohol (PVA), Suitable precursors for ITO nanostructures include monobutyl tin tri-chloride and indium acetate. A suitable precursor for ATO nanostructures is antimony tri-chloride.

In the second step, ITO or ATO nanostructures are formed from the precursor of the nanostructures in the polymer matrix. The nanostructure formation can be caused by adjusting the pH of the mixture followed by heating. The pH can be adjusted by introducing an agent, such as ammonia, into the mixture. For ITO nanostructures in a PVA aqueous solution, the nanostructures begin to form at a pH>8. After the pH is adjusted, the mixture is heated to a temperature of up to 200° C. Heating the solution to a temperature greater than 200° C. may cause the PVA matrix to decompose. As discussed above, heating the mixture for a longer time period can increase the size of the nanostructures.

The —OH groups on the PVA can attach to the nanostructures so the main chain of the PVA molecule can stabilize the nanostructures via steric stabilization. By varying the degree of hydroxylation and the molecular weight of PVA, the stabilization effect of the PVA can be optimized.

In the third step, the precursor solution for the polymer is converted to the polymer. As is well known in the art, the precursor solution can be converted to PVB by adding PVA solution to the mixture and then reacting the resulting mixture with butyraldehyde.

As discussed above, the properties of the final polymer can be effected by factors such as the type and amount of ions formed during the process, the pressure at which the mixture is held, etc.

Typically, the final PVB polymer has an average molecular weight greater than 70,000 as measured by size exclusion chromatography using low angle laser light scattering. On a weight basis, the final PVB polymer typically comprises 15 to 25% hydroxyl groups calculated as polyvinyl alcohol (PVA); 0 to 10% residual ester groups calculated as polyvinyl ester, and the balance being acetal groups.

In a non-limiting embodiment of the invention, the final PVB polymer is used as an interlayer in a laminated glass transparency for automotive and architectural applications. As is well known in the art, a laminated glass transparency can be manufactured by interposing an interlayer between at least two transparent glass sheets.

In this particular embodiment of the invention, a laminated glass transparency for an automotive and architectural applications embodiment, it is important that the nanostructures do not agglomerate. If the nanostructures were to agglomerate and effectively achieve a diameter of greater than 200 nm, the nanostructures would scatter visible light rays to such an extent that transmittance through the interlayer would be insufficient for the application. A polymer with nanostructures having an acceptable size for the application, can be determined using a "haze value". The haze value is associated with the degree to which transparency is prevented. The larger the nanostructures present in the polymer matrix, the higher the haze value. According to the present invention, laminated glass for automotive and architectural applications has a haze value of less than or equal to 1%, for example, less than or equal to 0.3%, or less than 0.2%, as measured using a Hazeguard System from BYK-Gardner in Columbia, Md.

In another non-limiting embodiment of the invention, poly [bis(diethylene glycol) diallylcarbonate] having oxide nanostructures such as titania, alumina, zirconia nanostructures incorporated into the polymer matrix is formed. Such a polymer can be formed in the following manner. In the first step, a precursor solution for poly [bis(diethylene glycol) diallylcarbonate] is mixed with a precursor for titania, alumina, or zirconia nanostructures.

Suitable precursor solution for poly [bis(diethylene glycol) diallylcarbonate] includes, but is not limited to, bis (diethylene glycol) diallylcarbonate monomer. Suitable precursors for titania nanostructures include, but are not limited to, titanium iso-propoxide, titanium (IV) chloride and potassium titanyl oxalate. Suitable precursors for alumina nanostructures include, but are not limited to, aluminum iso-propoxide, aluminum tri-tert-butoxide, aluminum tri-sec-butoxide, aluminum triethoxide, and aluminum pentanedionate. Suitable precursors for zirconia nanostructures include, but are not limited to, zirconium iso-propoxide, zirconium tert-butoxide, zirconium butoxide, zirconium ethoxide, zirconium 2,4-pentanedionate, and zirconium trifluoropentane-dionate.

In the embodiment where a poly [bis(diethylene glycol) diallylcarbonate] is being formed having titania nanostructures incorporated into the polymer matrix, the first step can comprise mixing titanium iso-propoxide with a 1-10 wt % $H_2O_2$ solution and bis(diethylene glycol) diallylcarbonate monomer. The $H_2O_2$ acts as an initiator for titania nanostructures; particularly, titania nanostructures in the anatase form. Optionally, polymers such as polyoxyethylene (20) sorbitan monooleate commercially available as Tween® 80 from ICI Ltd. (Bridgewater, N.J.) can be added to the solution to help stabilize the titania nanostructures.

In the second step, the titania nanostructures are formed from the precursor by heating the mixture to a temperature of up to 200° C.

In the third step, the precursor solution for the polymer is converted into bis(diethylene glycol) diallylcarbonate as is well known in the art. For example, isopropyl peroxycarbonate (IPP) which is a free radical initiator, can be added to bis(diethylene glycol) diallylcarbonate monomer. The IPP can be dissolved directly into the monomer, poured into a glass mold and heated above 70° C. for at least 8 hours or more to form poly [bis(diethylene glycol diallylcarbonate]. The IPP degrades into free radicals that react with the allyl groups terminating the monomer to begin polymerization.

In a non-limiting embodiment of the invention, poly [bis(diethylene glycol) diallylcarbonate] having titania, alumina, or zirconia nanostructures incorporated into the matrix of the polymer can be used as an optical lens. An optical lens made out of a poly [bis(diethylene glycol) diallylcarbonate] formed according to the present invention will have a larger elastic modulus and a higher refractive index than an optical lens made out of standard poly [bis(diethylene glycol) diallylcarbonate]. As a result of the higher refractive index, an optical lens made out of polymer formed according to the present invention does not have to be as thick as a conventional optical lens to satisfy a severe prescription.

A polymer with nanostructures having an acceptable size for the application can be determined using a "haze value". According to the present invention, an optical lens has a haze value of less than or equal to 0.6%, for example 0.2%, as measured using a Hazeguard System from SYK Gardner.

In a non-limiting embodiment of the invention, a polyurethane having ITO or ATO nanostructures incorporated into the polymer matrix is formed. Such a polymer can be formed in the following manner. In the first step, a precursor solution for the trimethylol propane, methylene bis(4-cyclohexylisocyanate) thiodiethanol is mixed with a precursor for ITO or ATO nanostructures.

A suitable precursor solution for the polyurethane is trimethylol propane, methylene bis(4-cyclohexylisocyanate), thiodiethanol includes, but is not limited to, 1,4-butanediol. Suitable precursors for ITO nanostructures include monobutyl tin tri-chloride and indium acetate. A suitable precursor for ATO nanostructures is antimony trichloride.

In the second step, ITO or ATO nanostructures are formed from the precursor. The nanostructure formation can be caused by adjusting the pH of the solution by introducing an agent, such as ammonia, into the mixture followed by heating the mixture. For ITO nanostructures, the ITO nanostructures start to form at pH>8. After the pH is adjusted, the mixture is heated to a temperature of up to 200° C. As discussed above, heating the mixture for a longer time period can increase the size of the nanostructures.

In the third step, the 1,4-butanediol is mixed into trimethylol propane, methylene bis(4-cyclohexylisoryanate), thiodiethanol as is well known in the art. For example, 1,4 butanediol, thiodiethanol, trimethylol propane (TMP), and Desmodur® W can all be mixed into a vessel and heated to 180° F. The mixture is mixed under vacuum for approximately 15 minutes, and then a tin catalyst, such as dibutyltindilaurate or bismuth carboxylate, is added to the mixture in a 25 ppm concentration. The mixture is then cast into a glass mold and cured for at least 20 hours at 250° F. to form the polyurethane.

In a non-limiting embodiment, trimethylol propane, methylene bis(4-cyclohexylisocyanate), thiodiethanol having ITO or ATO nanostructures incorporated into the polymer matrix is used to form an anti-static coating for aircraft windows. The polymer with the nanostructures has an elastic modulus that is greater than that of the standard trimethylol propane, methylene bis(4-cyclohexylisocyanate) thiodiethanol without ITO/ATO nanoparticles.

A polymer with nanostructures having an acceptable size for the aircraft window application can be determined using a "haze value". According to the present invention, a laminated aircraft window has a haze value of less than or equal to 1%, for example 0.5%, as measured using a Hazeguard System from BYK Gardner.

It will be readily appreciated by those skilled in the art that modifications may be made to the invention without departing from the concepts disclosed in the foregoing description. Such modifications are to be considered as included within the scope of the invention. Accordingly, the particular embodiments described in detail hereinabove are illustrative only and are not limiting as to the scope of the invention, which is to be given the full breadth of the appended claims and any and all equivalents thereof.

What is claimed is:

1. A method for making a polymer having a matrix that has nanostructures incorporated into the matrix of the polymer, comprising:

a. mixing a precursor solution for the polymer comprising bis(diethylene glycol)diallylcarbonate monomer with a precursor for the nanostructures selected from titanium iso-propoxide, titanium (IV) chloride, potassium titanyl oxalate, aluminum iso-propoxide, aluminum tri-tert-butoxide, aluminum tri-sec-butoxide, aluminum tri-ethoxide, aluminum pentanedionate, zirconium iso-propoxide, zirconium tert-butoxide, zirconium butoxide, zirconium ethoxide, zirconium 2,4-pentanedionate, and zirconium trifluoropentane-dionate, to form a mixture, wherein the mixture consists of the precursor solution for the polymer and the precursor for the nanostructures;

b. forming nanostructures in the mixture from the precursor of the nanostructures, wherein the nanostructures are surrounded by the precursor solution for the polymer when the nanostructures are formed; and c. forming the polymer from the precursor solution of the polymer so that the nanostructures are incorporated into the matrix of the polymer.

2. The method according to claim 1, wherein forming nanostructures comprises heating the mixture.

3. The method according to claim 1, wherein the polymer has a nanostructure concentration ranging from 0.1% to 90% based on volume.

4. The method according to claim 1, wherein the polymer has a nanostructure concentration ranging from 15% to 80% based on volume.

5. The method according to claim 1, wherein the polymer is poly[bis(diethylene glycol)diallylcarbonate] and the nanostructures are titania.

6. The method according to claim 1, wherein the polymer comprises nanostructures having a longest dimension ranging from 1 nm to 1,000 nm.

7. The method according to claim 1, wherein the polymer comprises nanostructures having an aspect ratio of 1:1 to 1:1000.

8. The method according to claim 1, wherein said polymer is free of agglomerated nanostructures.

* * * * *